(12) United States Patent
Anderson

(10) Patent No.: US 6,834,558 B2
(45) Date of Patent: Dec. 28, 2004

(54) COMBINED TORQUE MEASUREMENT AND CLUTCH APPARATUS

(75) Inventor: Stephen Arthur Anderson, Verdun (CA)

(73) Assignee: Pratt & Whitney Canada Corp., Longueuil (CA)

(*) Notice: Subject to any disclaimer, the term of this patent is extended or adjusted under 35 U.S.C. 154(b) by 127 days.

(21) Appl. No.: 09/991,220

(22) Filed: Nov. 16, 2001

(65) Prior Publication Data

US 2003/0094053 A1 May 22, 2003

(51) Int. Cl.[7] .............................. G01L 3/02; G01L 3/00; G01L 3/20; G01L 3/22
(52) U.S. Cl. .............................. 73/862.323; 73/862.08; 73/862.14; 73/862.17
(58) Field of Search ....................... 73/862.323, 862.08, 73/862.14, 862.17, 862.324; 192/21.5

(56) References Cited

U.S. PATENT DOCUMENTS

| | | | |
|---|---|---|---|
| 2,744,409 A | | 5/1956 | Wintle et al. |
| 4,520,680 A | | 6/1985 | Tatsumi |
| 4,520,681 A | * | 6/1985 | Moore et al. ............. 73/862.28 |
| 4,609,155 A | * | 9/1986 | Garnier ....................... 241/30 |
| 5,137,128 A | | 8/1992 | Takei et al. |
| 5,779,013 A | * | 7/1998 | Bansbach ................. 192/21.5 |
| 5,918,286 A | | 6/1999 | Smith et al. |

OTHER PUBLICATIONS

Magnetic field strength controls torque transfer, Invention Machine Corp. 1997–1999.

* cited by examiner

Primary Examiner—Edward Lefkowitz
Assistant Examiner—Lilybett Martir
(74) Attorney, Agent, or Firm—Ogilvy Renault

(57) ABSTRACT

A method of using a magnetic fluid clutch for torque measurement comprises steps of modulating electric current through a coil of the magnetic fluid clutch to maintain a steady-state quasi-solid phase of a magnetic fluid medium contained within the magnetic fluid clutch when the magnetic fluid clutch is clutched to transmit torque from a torque input end of the clutch to a torque output end of the clutch, thereby ensuring that the torque output end rotates in response to the rotation of the torque input end without relative rotational slippage therebetween; and measuring a deflection value associated with the magnetic fluid clutch. The clutch is thereby used as a combined torque measurement and clutch apparatus.

5 Claims, 2 Drawing Sheets

COMBINED TORQUE MEASUREMENT AND CLUTCH APPARATUS

FIELD OF THE INVENTION

The present invention generally relates to torque measurement, and more particularly to a method of using a magnetic fluid clutch for torque measurement as well as to a combined torque measurement and clutch apparatus for use with this method.

BACKGROUND OF THE INVENTION

Engines which are utilized in single-engine helicopter applications typically incorporate a freewheeling clutch and a separate torque measuring device which is within or attached to the reduction gear box, or is attached to a drive system of the helicopter in order to establish torque transmission to the main rotor and to monitor the torque value transmitted to the main rotor, or facilitate auto-rotation in the event of a reduction or loss of engine power.

It is known that torque measurement can be achieved by a phase shift measuring device used to measure an angular deviation between two ends of a rotating shaft which transmits torque. One example of such a phase shift measuring device is described in U.S. Pat. No. 4,520,681, issued to Moore et al. on Jun. 4, 1985. The device of Moore et al. includes two slotted disks disposed on a rotating shaft a predetermined distance apart. A slot is formed in the periphery of each of the disks. A light source and a light sensor are mounted stationary with respect to the shaft and proximate to the periphery of each disk. The time duration between signals from the respective sensors is measured and the angular deviation of the two disks can be calculated therefrom. Measurement of this angular deviation determines the amount of twist on the shaft portion between the two disks. The torque can then be calculated from this angle of twist, by a computerized central processing device.

Another example of phase shift measuring devices is described in U.S. Pat. No. 5,918,286, which issued to Smith et al. on Jun. 29, 1999. Smith et al. describe a device for torque measurement of rotating shafts for the purpose of calculating the shaft power without using sensors mounted or glued to the shaft. Accuracy is increased by using only one single optical electronic sensor in the pulse receiver. The light is transmitted from the source/transmitter through optical fiber. The light beam is pulsed within two air gaps by coding disks/gear wheels mounted to the shaft at a convenient distance from each other. The time displacement between the vanes/teeth on the two disks/gear wheels is a measure on the shaft torque, enabling the shaft power to be calculated by a computer. To increase the accuracy in case of shaft vibration, the width modulated pulses are accumulated and averaged at convenient numbers of shaft turns. The accuracy is increased by detecting both rising and falling pulse edges in order to double the number of pulses of each shaft turn.

The angular deviation of the rotating shaft which transmits torque depends on both the torque value being transmitted through the rotating shaft and the resilient property in angle deviation of the rotating shaft, which is inherent in the nature of the shaft material and is further determined by the geometry of the shaft. Thus, the amount of torque transmitted through the rotating shaft can be calculated from the angular deviation of the rotating shaft because the geometry of the rotating shaft and the nature of the shaft material are not variable. Nevertheless, the rotating shaft is generally designed for full load torque transmission and therefore the angular deviation of the rotating shaft at a low torque level will be relatively small, resulting in inaccuracies in the torque measurement. However, such accuracy is needed for example, in helicopter rotor applications.

Therefore, there is a need for a method and apparatus for torque measurement which provide adequate measuring accuracy at various torque levels.

SUMMARY OF TEE INVENTION

A primary object of the present invention is to provide a method of using a magnetic fluid clutch for torque measurement and transmission.

Another object of the present invention is to provide a method and apparatus for torque measurement which provides adequate accuracy at various torque levels.

A further object of the present invention is to provide a combined torque measurement and clutch apparatus and a method for using the apparatus for torque transmission and torque measurement.

The present invention is generally directed to a method of using a magnetic fluid clutch for torque measurement. The method comprises: modulating electric current through a coil of the magnetic fluid clutch to maintain a steady-state quasi-solid phase of a magnetic fluid medium contained within the magnetic fluid clutch when the magnetic fluid clutch is clutched to transmit torque from a torque input end of the clutch to a torque output end of the clutch, thereby ensuring that the torque output end rotates in response to the rotation of the torque input end without relative rotational slippage therebetween; and measuring a deflection value associated with the magnetic fluid clutch.

The deflection value associated with the magnetic fluid clutch is preferably measured by way of a phase shift measurement between the torque input end and the torque output end of the magnetic fluid clutch. The deflection value associated with the magnetic fluid clutch is also preferably measured by way of distortion measurement of a magnetic field applied to the magnetic fluid medium and then, a torque value can be calculated from the measured deflection value associated with the magnetic fluid clutch.

The viscosity/solidity of the magnetic fluid medium which is maintained in the steady-state quasi-solid phase, according to one embodiment of the present invention, can be varied to a level which matches a level of torque being transmitted through the magnetic fluid clutch so that the deflection value being measured is optimized within an adequate measuring range of a measuring device used for the measurement. For example, electric current through the coil of the magnetic fluid clutch can be modulated to increase the viscosity/solidity of the magnetic fluid medium when the level of torque being transmitted is relatively large; and the electric current through the coil of the magnetic fluid clutch can be modulated to decrease the viscosity/solidity of the magnetic fluid medium when the level of torque being transmitted is relatively small. Nevertheless, the change of the viscosity/solidity of the magnetic fluid medium should not change the no slippage work condition of the magnetic fluid clutch when the magnetic fluid clutch is used for torque measurement.

In accordance with another aspect of the present invention, an apparatus is provided including a magnetic fluid clutch which has a torque input end and a torque output end. The magnetic fluid clutch further includes a magnetic fluid medium therein and a coil for generating a magnetic field and applying the magnetic field to the magnetic fluid medium. The torque input end is adapted to be connected to a torque supply source, an engine of a helicopter for example, and the torque output end is adapted to be connected to a rotational work device, the main rotor of the helicopter for example. The apparatus further includes a first detector positioned at the torque input end and a second detector positioned at the torque output end. A processor is provided for controlling current through the coil of the magnetic fluid clutch and for processing signals from the first and second detectors to calculate an angular deviation between the torque input end and the torque output end.

The processor is preferably incorporated into a controller of an engine, or incorporated into a controller of an aircraft.

In one embodiment of the present invention, the magnetic fluid clutch comprises a rotating shaft having a first end and a second end. One of the ends forms the torque output end of the magnetic fluid clutch. A casing surrounding the rotating shaft is rotatable relative to the rotating shaft, and contains the magnetic fluid medium therein. The rotating casing forms the torque input end of the magnetic fluid clutch. Rotating members such as blades are affixed to the respective rotating shaft and the inside surface of the casing in order to increase the frictional contact of the respective rotating shaft and the rotating casing with the magnetic fluid medium.

In another embodiment of the present invention, the magnetic fluid clutch comprises a stationary casing containing the magnetic fluid medium therein. A first rotating shaft and a second rotating shaft form the respective torque input end and torque output end. The respective rotating shafts extend oppositely and outwardly from the inside of the casing and are rotatable relative to each other and relative to the casing. A first plate and a second plate are affixed to the first and second rotating shafts respectively, and are axially spaced apart. The first plate and second plate are disposed in the magnetic fluid medium so that torque can be transmitted from the first plate to the second plate through the magnetic fluid medium when the viscosity/solidity of the magnetic fluid medium reaches a certain level.

The apparatus according to the present invention combines a clutch device with a torque measurement device and can have broad application potential, because of not only providing a new option for machine structure design, but also providing a new torque measurement method which provides more measurement accuracy. The latter is advantageous, particularly at low torque levels compared to a full load torque level of the machine into which the apparatus is incorporated.

Other advantages and features of the present invention will be better understood with reference to preferred embodiments of the present invention described hereinafter.

BRIEF DESCRIPTION OF THE DRAWINGS

Having thus generally described the nature of the present invention, reference will now be made to the accompanying drawings, showing by way of illustration, the preferred embodiments thereof, in which.

DETAILED DESCRIPTION OF THE PREFERRED EMBODIMENT

Figure 1:
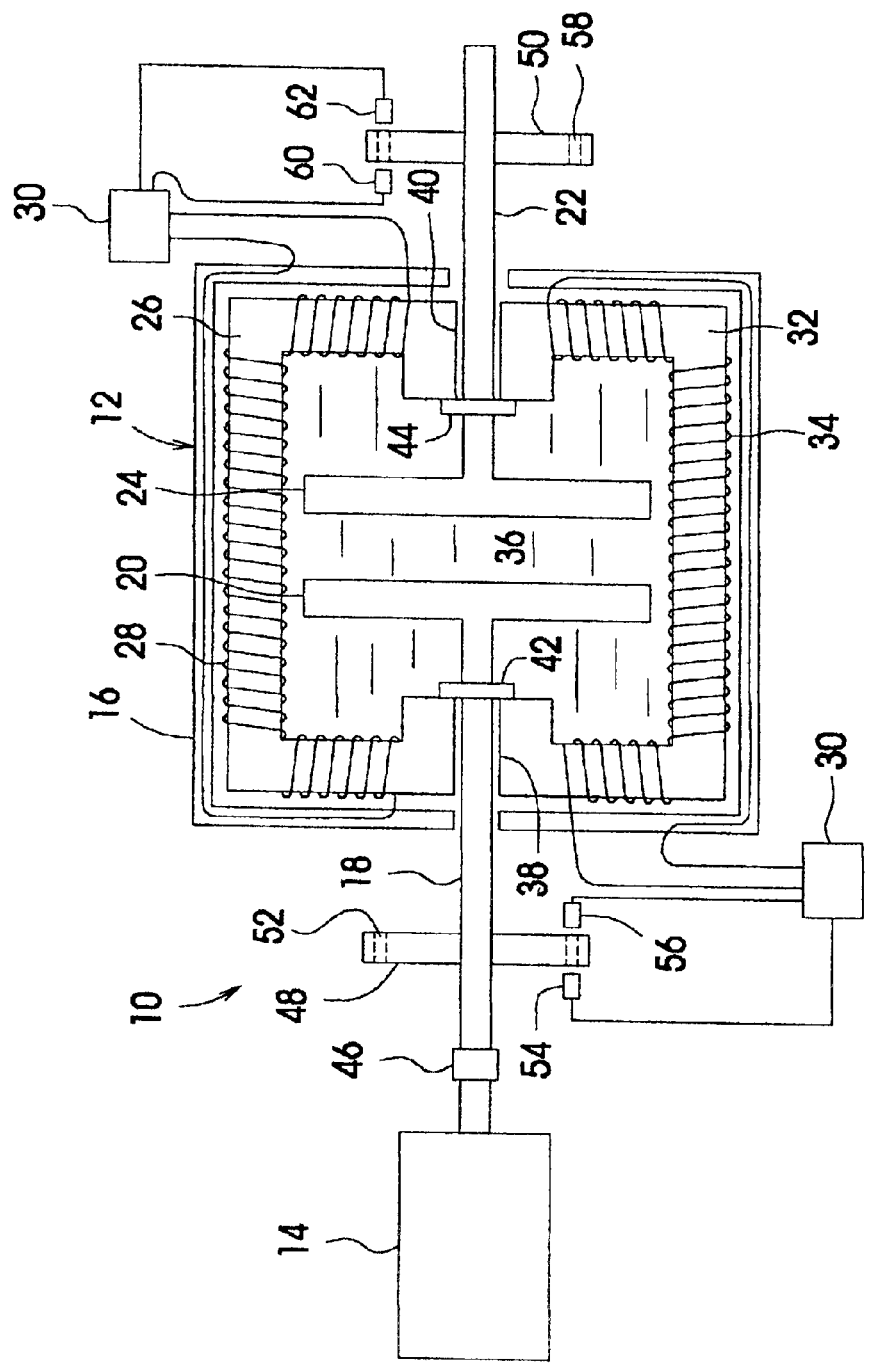
FIG. 1 is a schematic illustration of a combined torque measurement and clutch apparatus according to one embodiment of the present invention showing a direct drive application in which the apparatus is directly coupled to an engine.

With reference to FIG. 1, an apparatus of the present invention generally designated at numeral 10, includes a magnetic fluid clutch 12 which is directly coupled to an engine 14, and thereby forms a torque output end of the engine 14. The magnetic fluid clutch 12 includes a casing 16 supported on a stationary structure (not shown) of the engine 14. A torque input shaft 18 extends outwardly from the inside of the casing 16 and is rotatable relative to the casing 16. A first plate 20 is attached to the inner end of the torque input shaft 18 and is rotatable together with the shaft 18. The magnetic fluid clutch 12 further includes a torque output shaft 22 which extends, oppositely with respect to the torque input shaft 18, outwardly from the inside of the casing 12 and is rotatable relative to the casing 12. A second plate 24 is attached to the inner end of the torque output shaft 22 and is rotatable together with the shaft 22. The torque input and output shafts 18, 22 are positioned co-axially and the first and second plates 20, 24 are axially spaced apart from each other.

The magnetic fluid clutch 12 further includes a first core material 26 and a coil 28 wound around the first core material 26. The two ends of the coil 28 are connected to an electronic controller 30 which is incorporated into a control system of the engine 14, for example, a control system of a helicopter which is equipped with the engine 14. A second core material 32 likewise has a coil 34 wound therearound. The two ends of the coil 34 are connected to the electronic controller 30 which is the same one controlling the coil 28, but is illustrated separately.

Both the first and second plates 20, 24 are immersed in a magnetic fluid medium which is generally designated by numeral 36 and is contained within the casing 16. The core materials 26, 32 are preferably positioned within the casing 16 and the magnetic fluid medium 36 is contained by an interior surface of the core materials 26, 32. Alternatively, an inner casing (not shown) may be provided to protect coils 28 and 34. The first and second plates 20, 24 and the first and second core materials 26, 32 preferably have a circular cross-section. The size of the first and second plates 20, 24 and the volume of the magnetic fluid medium 36 are determined by the specific properties of the magnetic fluid medium chosen, as well as performance specifications of the magnetic fluid clutch 12. The torque input shaft 18 and the torque output shaft 22 pass through axially aligned openings 38, 40 defined by core materials 26, 32. Seals 42, 44 are also preferably placed between openings 38, 40 and the magnetic fluid medium 36, in order to prevent leakage thereof.

The electronic controller 30 provides current through coils 28, 34 in a controlled manner in order to apply an electric magnetic field to the magnetic fluid medium 36.

The torque input shaft 18 is coupled at its outer end directly to the engine 14 by means of a coupler 46. The torque output shaft 22 is adapted to be connected at its outer end to a rotational work device, for example, the main rotors of the helicopter.

The magnetic fluid clutch 12 provides a magnetically controlled fluid coupling between the first and second plates 20, 24. Magnetic fluid medium 36 contains magnetically polarized particles. When a magnetic field which can be generated and controlled by the current through the coils 28, 34 is applied to the magnetic fluid medium 36, particle chains form. In effect, magnetic fluid medium 36 changes from a free flowing state (steady-state liquid phase) to a highly viscous state (steady-state quasi-solid phase) when electric current is steadily increased through coils 28, 34. Various intermediate levels of viscosity/solidity can be obtained by varying the magnetic field applied to the magnetic fluid medium 36. Advantageously, the response time for the magnetic fluid medium 36 to change between a steady-state quasi-solid phase and a steady-state liquid phase is in the millisecond range. Therefore, torque transfer control changes can be performed very quickly. The property of the magnetic fluid medium 30 is described in more detail in U.S. Pat. No. 5,779,013, issued to Bansbach on Jul. 14, 1998, which is incorporated herein by reference.

A first disk 48 is affixed to the torque input shaft 18 at the outside of the casing 16 and is rotatable together with the shaft 18. A second disk 50 is affixed to the torque output shaft 22 at the outside of the casing 16 and is rotatable together with the shaft 22. The first disk 48 has a plurality of slots or holes 52 on the periphery thereof. The holes 52 extend through the disk 48, adjacent to the periphery thereof, and are circumferentially and equally spaced apart from one another. A light source 54 is disposed on one side of the first disk 48 at a right angle thereto, such that the light emitted therefrom will pass through the holes 52 when the respective holes 52 are aligned with the light source 54. A detector 56 is disposed on the other side of the first disk 48 at a right angle thereto. The detector 56 is disposed such that light emitted by the light source 54 impinges thereon when the respective holes 52 pass thereby. The light source 54 and the detector 56 are both stationary with respect to the rotating torque input shaft 18. The second disk 50 has a plurality of slots or holes 58 disposed on the periphery thereof. The holes 58 extending through the second disk 50 are disposed adjacent to the periphery thereof and are circumferentially and equally spaced apart from one another. A light source 60 is disposed on one side of the second disk 50 adjacent to the periphery thereof, such that light emitted therefrom passes through the respective holes 58 when the respective holes 58 are rotated past the light source 60. A detector 62 is disposed on the opposite side of the second disk 50 from the light source 60, such that light passing through the respective holes 58 impinges upon the detector 62. The light source 60 and the detector 62 are stationary with respect to the rotating torque output shaft 22, as described above with reference to the light source 54 and the detector 56.

When the magnetic fluid clutch 12 is required to be declutched to terminate torque transmission from the engine 14, to the main rotor (not shown) for example, the electronic controller 30 supplies no current or only a small amount of current through the coils 28, 34, thereby maintaining the magnetic fluid medium 36 in a substantially steady-state liquid phase. The first plate 20 which is driven by the engine 14 can rotate freely in the magnetic fluid medium 36 and the friction between the magnetic fluid medium 36 and the first and second plates 20, 24 is so small that the second plate 24 cannot be driven to rotate by the first plate 20 by means of the magnetic fluid medium 36.

When a full load torque transmission is required, the electronic controller 30 provides an increased current through the coils 28, 34 above a predetermined level so that the magnetic fluid medium 36 is in a substantially steady-state quasi-solid phase. Thus, the friction between the magnetic fluid medium 36 and the first and second plates 20, 24 reaches a significant level such that the second plate 24 can be driven to rotate by the first plate 20 by means of the magnetic fluid medium 36, without rotational slippage relative to the first plate 20.

It is noted that the steady-state quasi-solid phase of the magnetic fluid medium 36 is not only determined by the viscosity/solidity of the magnetic fluid medium 36 but also depends on the level of torque transmitted therethrough. The magnetic fluid medium 36 with a predetermined viscosity/solidity level permits a maximum level of torque to be transmitted therethrough. When torque transmission is below the permitted level, no rotational slippage will occur between the first and second plates 20, 24. Therefore, the magnetic fluid medium 36 with the predetermined viscosity/solidity is in a steady-state quasi-solid phase with respect to the torque transmission level which is below the permitted maximum level. However, the magnetic fluid medium 36 with the same predetermined viscosity/solidity is not in a steady-state quasi-solid phase with respect to torque levels to be transmitted which are equal to or above the permitted maximum level, because rotational slippage between the first and second plates 20, 24 will occur. In fact, the slippage between the first and second plates 20, 24 make torque transmission above the permitted maximum level impossible. This feature of the magnetic fluid medium also provides advantages for torque measurement using the magnetic fluid clutch 12 which will be further described below.

Under the condition of the magnetic fluid medium 36 being maintained in a steady-state quasi-solid phase which means no rotational slippage occurs between the first and second plates 20, 24, and during rotation of the torque input shaft 18 and the torque output shaft 22 under a "no load" condition, the angular relationship of the first disk 48 with respect to the second disk 50 remains constant. However, if torque is transmitted through the clutch 12, a corresponding torsional movement or twist between the first and second disks 48, 50 will result, and a relative angular deviation between the first disk 48 and the second disk 50 will occur. The amount of this angular deviation is a function of the torque, the properties of the magnetic fluid medium 36, and the properties of the portions of the shafts 18, 22 between the two disks 48, 50.

In order to measure the amount of angular deviation between the two disks 48, 50, the output of the detectors 56, 62 is monitored to determine the angular position at which the respective holes 52, 58 pass by the detectors 56, 62. By determining the points in time at which the light from the light source 54 impinges on the detector 56, an indication can be obtained of the relative position of the holes 52 with respect to the rotation of the torque input shaft 18 about its longitudinal axis. In a similar manner, measurement of the output of the detector 62 also provides the relative position of the holes 58 with respect to the rotation of the output shaft 22. By comparing the outputs of the detectors 56, 62 with respect to time, a relative angular position of the holes 52, 58 can be determined. In this manner, an angular deviation due to twist between the two disks 48, 50 can be determined with a high degree of precision.

The signals from the detectors 56, 62 are processed in the electronic controller 30. The electric current through the coils 28, 34 is modulated at several predetermined levels in accordance with a series of permitted maximum torque levels. When the relative angular deviation between the two disks 48, 50 being detected by the detectors 56, 62 is relatively small, the electric current should be modulated to a lower level in order to decrease the viscosity/solidity of the magnetic fluid medium 36 so that the angular deviation between the two disks 48, 50 will increase, thereby resulting in a higher degree of measurement precision. As a general rule, the electric current level should be selected in accordance with a permitted maximum torque transmission level which is presumed to be greater than, but close to the torque level being transmitted and measured, such that the magnetic fluid medium 36 is maintained in a relatively steady-state quasi-solid phase with respect to the torque level being transmitted and measured, in order to ensure that no slippage condition exists, while resulting in a relatively large amount of angular deviation between the two disks 48, 50, which increases the measurement precision.

Figure 2:
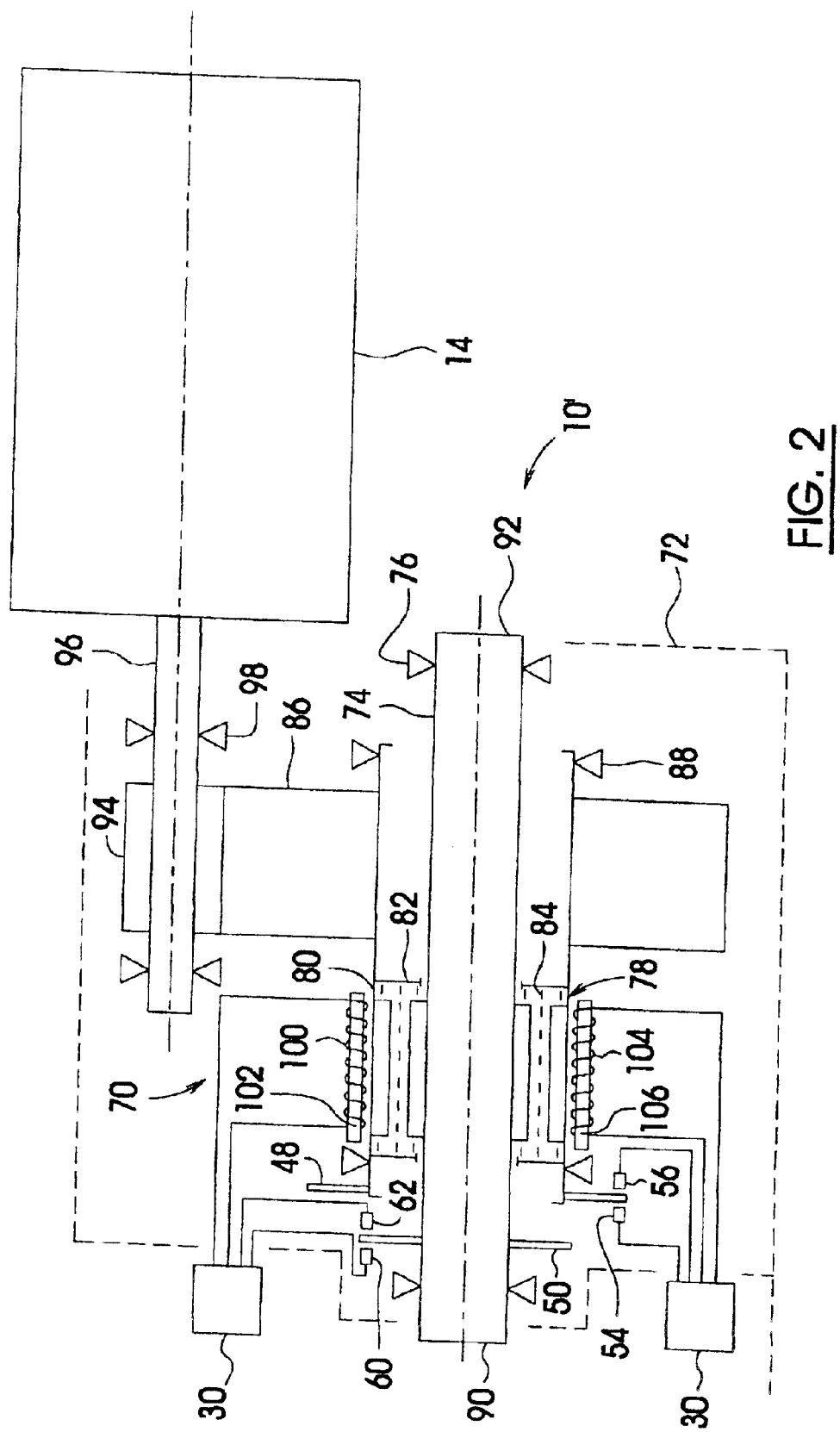
FIG. 2 is a schematic illustration of the combined torque measurement and clutch apparatus according to another embodiment of the present invention, showing a reduction gearbox application in which the apparatus is incorporated into a reduction gear box of an engine.

FIG. 2 illustrates another embodiment of the present invention, generally designated by numeral 10' in which components similar to those of the apparatus 10 illustrated in FIG. 1 are indicated by similar numerals and will not therefore be redundantly described in detail.

The combined torque measurement and clutch apparatus 10' includes a magnetic fluid clutch 70 coupled to the engine 14 by means of a reduction gear box 72 (shown in broken lines) and is supported within the reduction gear box 72.

The magnetic fluid clutch 70 includes a rotating shaft 74 rotatably supported by bearings 76 in the gear box 72, and a cylindrical casing 78 surrounding and rotatable relative to the rotating shaft 74. The cylindrical casing 78 includes a cylindrical wall 80 and two side walls 82, defining in combination the casing therebetween and containing a magnetic fluid medium 84 therein. The cylindrical wall 80 of the casing 78 further includes extended sections at opposed ends.

The disk 48 and a gear 86 are mounted on the respective extended sections of the cylindrical wall 80 of the casing 78 at the opposite ends thereof. The casing 78 is also rotatably supported in the gear box 72 by bearings 88 at the respective extended sections of the cylindrical wall 80 at the opposite ends thereof.

The second disk 50 is mounted at a first torque output end 90 of the rotating shaft 74 which is connected, for example, to the main rotor (not shown) of the helicopter. A second torque output end 92 of the rotating shaft 74 is provided and may be connected for example, for driving the tail rotor (not shown) of a helicopter. The gear 86 mounted on the casing 78 forms a torque input end of the magnetic fluid clutch 70 and engages gear 94 which is mounted on a torque output shaft 96 of the engine 14. The torque output shaft 96 of the engine 14 is also rotatably supported within the gear box 72 by bearings 98.

A coil 100 is wound around a first core material 102 and is connected to the electronic controller 30. A coil 104 is wound around a second coil material 106 and is connected to the electronic controller 30. Similar to those illustrated in FIG. 1, the controller 30 in FIG. 2 is a single device but is illustrated as two separate blocks. The first and second core material 102 and 106 are supported on a stationary structure (not shown) of the gear box 72, and preferably, in combination form a ring around the casing 78 and are radially apart therefrom so that the magnetic fluid field generated by current passing through the coils 100, 104 is applied to the magnetic fluid medium 84 within the casing 78.

Similar to the apparatus 10 illustrated in FIG. 1, the light sources 54, 60 and detectors 56, 62 are disposed at the opposite sides of the respective disks 48, 50, and are connected to the electronic controller 30. The holes 52 and 58 of the respective disks 48 and 50 illustrated in FIG. 1 are also provided in the respective disks 48, 50 of the embodiment 10' but are not shown in FIG. 2.

When the casing 78 is rotated by the engine 14, the rotating shaft 74 will remain immobile or will rotate in response to the rotation of the casing 78, depending on the viscosity/solidity condition of the magnetic fluid medium 84. In order to increase the frictional contact of the magnetic fluid medium 84 with the rotating casing 78 and the rotating shaft 74, rotating members which include, for example, circumferentially spaced blades, are preferably attached to the respective rotating casing 78 and the rotating shaft 74 and are immersed in the magnetic fluid medium 84 within the casing 78, as illustrated but not indicated with numerals in FIG. 2.

During operation, the apparatus 10' performs the same functions as that of apparatus 10 which is illustrated in FIG. 1 for both torque transmission and torque measurement. The method of using the apparatus 10' for clutching, and declutching in torque transmission and for measuring torque in a selected measuring range is the same as described with reference to the apparatus 10 illustrated in FIG. 1, and will not therefore be described again herein.

The phase shift measuring devices which include the disks 48, 50, light sources 54, 60 and detectors 56, 62, used in apparatus 10 and 10', in FIGS. 1 and 2 for torque measurement, can be substituted by means for detecting distortion of the magnetic field applied to the magnetic fluid medium 36 or 84. The magnetic field distortion is a function of the torque level transmitted through the magnetic fluid medium 36 or 84 to which the magnetic field is applied. Therefore, the torque value can be calculated by a processor from the result of the magnetic field distortion measurement.

Modifications and improvements to the above-described embodiments of the present invention may become apparent to those skilled in the art. The magnetic fluid clutch used in the embodiments of the present invention may be varied in configuration. For example, the rotating shaft 74 of the magnetic fluid clutch 70 can be used as a torque input end of the clutch, and the gear 86 mounted on the casing 78 can be used as a torque output end of the clutch. The light sources 54, 60 and the light detectors 56, 62 may also be replaced by various electric or electronic detectors, or transducers The foregoing description is intended to be exemplary rather than limiting. The apparatus of the present invention can be used for helicopter engines, but also can be used in various other applications. The scope of the invention is therefore intended to be limited solely by the scope of the appended claims.

I claim:

1. An apparatus for measuring torque comprising:

a magnetic fluid clutch including a rotating shaft having a first end and a second end, one of the ends forming a torque output end of the magnetic fluid clutch, the magnetic fluid clutch including a magnetic fluid medium therein and a coil for generating a magnetic field and applying the magnetic field to the magnetic fluid medium, the magnetic fluid clutch further including a casing surrounding and rotatable relative to the rotating shaft and containing the magnetic fluid medium therein, the rotating casing forming a torque input end of the magnetic fluid clutch, the torque input end being adapted to be connected to a torque supply source and the torque output end being adapted to be connected to a rotational work device;

a first detector positioned at the torque input end;

a second detector positioned at the torque output end; and a processor for controlling current through the coil of the magnetic fluid clutch and processing signals from the first and second detectors to calculate an angular devia tion between the torque input end and the torque output end, the angular deviation being a function of an adjustable property of the magnetic fluid medium in a steady-state quasi-solid phase thereof.

2. An apparatus as claimed in claim 1 wherein the processor is incorporated into a controller of an engine.

3. An apparatus as claimed in claim 1 wherein the processor is incorporated into a controller of an aircraft.

4. An apparatus as claimed in claim 1 wherein the magnetic fluid clutch comprises a first rotating member affixed to the rotating shaft and a second rotating member affixed to an inside surface of the casing in order to increase frictional contact of the respective rotating shaft and the casing with the magnetic fluid medium.

5. An apparatus is claim in claim 1 wherein the processor is adapted to vary electric current through the coil of the magnetic fluid clutch, thereby determining a level of adequate measuring range in which the calculated angular deviation is optimized.

* * * * *